Oct. 25, 1955  R. E. LATHAM  2,721,538
ANIMAL OPERATED POWER BRUSH GROOMING DEVICE
Filed May 10, 1954  2 Sheets-Sheet 1

INVENTOR.
ROY E. LATHAM
BY Hazard & Miller
ATTORNEYS

Oct. 25, 1955        R. E. LATHAM        2,721,538
ANIMAL OPERATED POWER BRUSH GROOMING DEVICE
Filed May 10, 1954        2 Sheets-Sheet 2
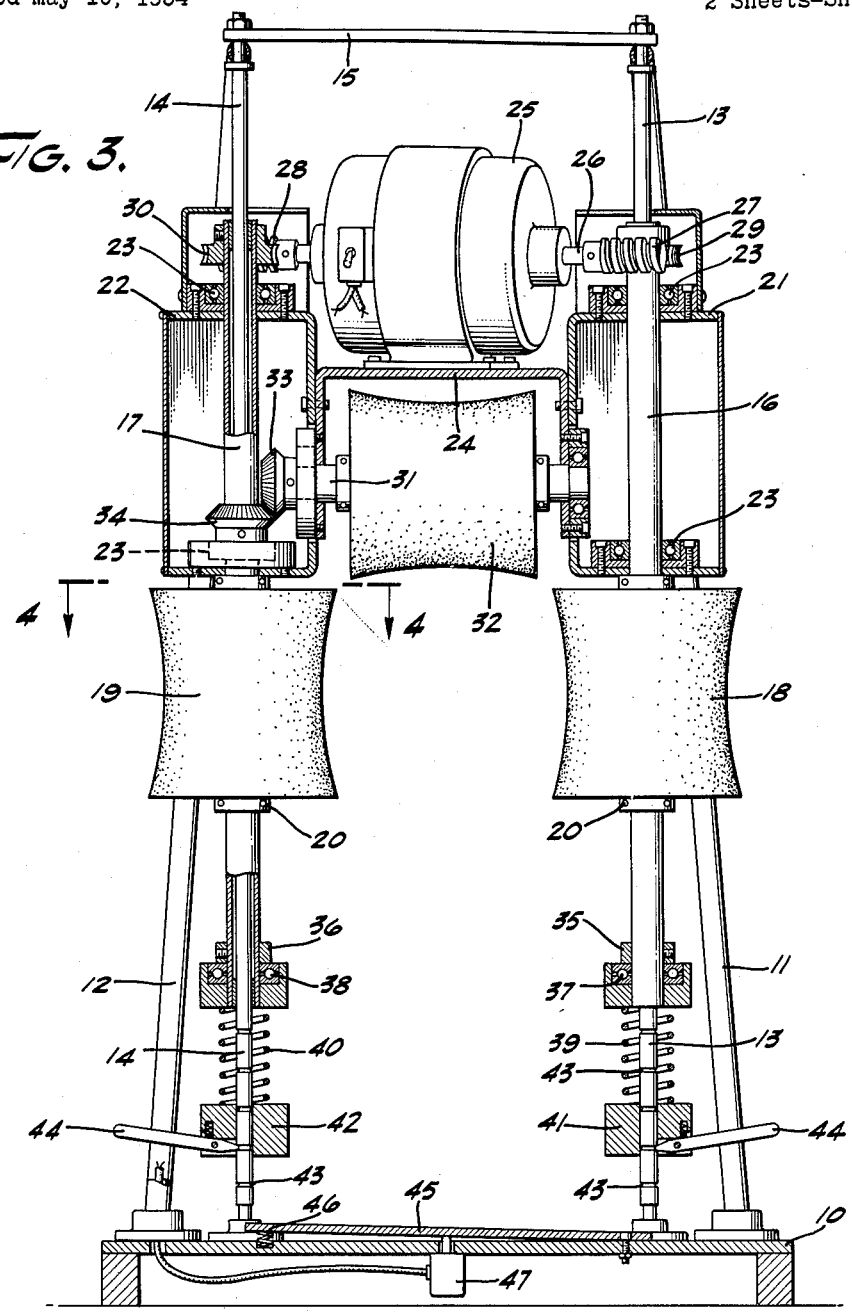
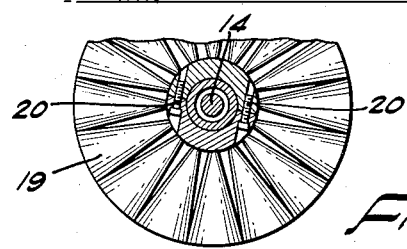
INVENTOR.
ROY E. LATHAM
BY Hazard & Miller
ATTORNEYS

United States Patent Office 2,721,538
Patented Oct. 25, 1955

2,721,538

ANIMAL OPERATED POWER BRUSH GROOMING DEVICE

Roy E. Latham, Montebello, Calif.

Application May 10, 1954, Serial No. 428,418

7 Claims. (Cl. 119—91)

This invention relates to a power driven animal brush.

Explanatory of the present invention, it is well known by dog fanciers that a dog should be regularly brushed and groomed, particularly if the dog is to present his best appearance at the time that he is shown. It is also well known that dogs usually enjoy being brushed or scratched, particularly on those portions of their bodies that are relatively inaccessible to them, especially on their backs and on their sides.

An object of the present invention is to provide a power driven animal brush consisting essentially of three rotary brushes, two of which are disposed in spaced relation and are arranged opposite each other so as to be engageable with the sides of a dog, or similar animal, and the third of which is rotatable about a substantially horizontal axis adjacent the upper ends of the opposed rotary brushes so as to be engageable with the back of the dog. In this manner, if the dog is positioned between the two opposed brushes and beneath the upper horizontal brush, the brushes when power driven will brush the animal's coat very effectively.

Another object of the invention is to provide a power driven animal brush having the above-mentioned characteristics wherein the brushes are rotated by an electric motor controlled by a switch that is operable by a depressible platform located beneath the brushes. Intelligent dogs familiar with the brush can thus walk between the brushes whenever they desire to be brushed, and by means of their own weight depress the platform to energize the electric motor. When they tire of the brushing, on walking from the platform the switch operable thereby is caused to automatically break the circuit through the motor and thus deenergize the motor until such time as the animal returns.

Still another object of the invention is to provide a power driven animal brush consisting of two opposed rotary brushes engageable with the sides of the animal and a third rotary brush engageable with the back of the animal wherein the brushes and the power means therefor are spring supported so as to be vertically movable, as occasion may require in the course of brushing.

Another object of the invention is to provide a construction having the above-mentioned characteristics wherein the entire structure is vertically adjustable so as to be usable upon animals of different sizes.

With the foregoing and other objects in view, which will be made manifest in the following detailed description and specifically pointed out in the appended claims, reference is had to the accompanying drawings for an illustrative embodiment of the invention, wherein:

Fig. 3 is an enlarged vertical section taken substantially upon the line 3—3 upon Fig. 1; and Fig. 4 is a horizontal section taken substantially upon the line 4—4 upon Fig. 3.

Figure 1:
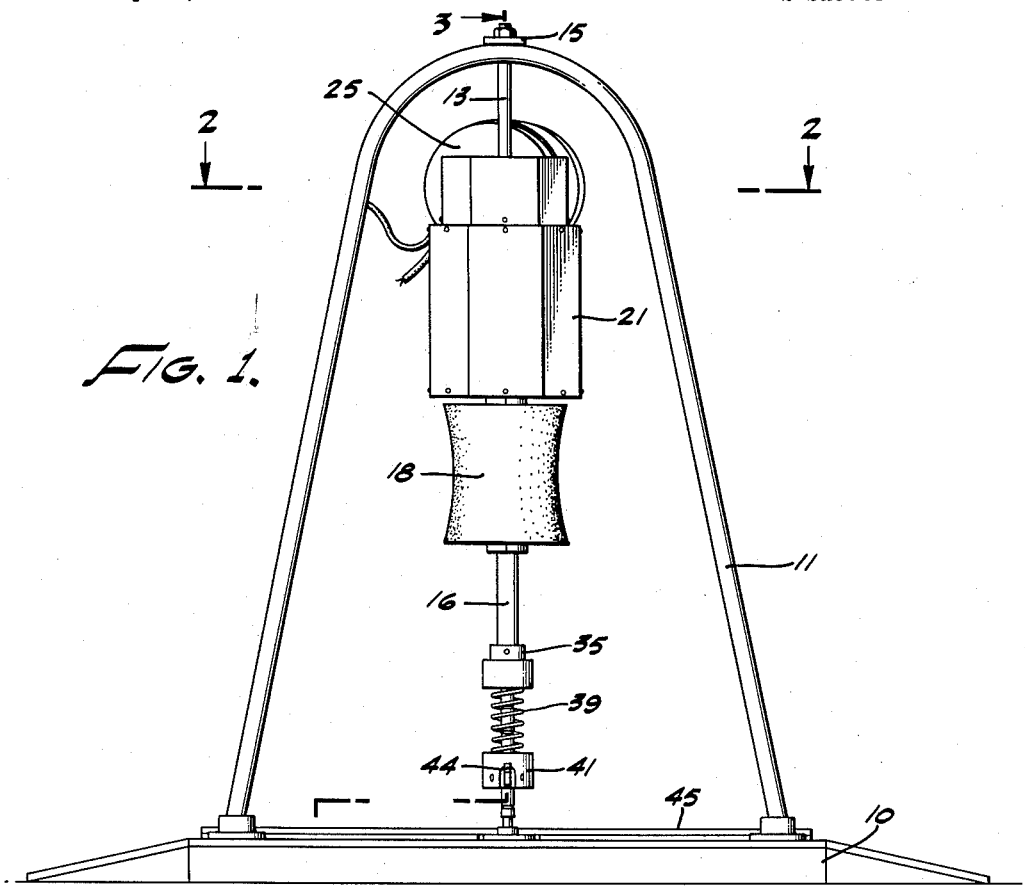
Figure 1 is a view in side elevation of the animal brush, embodying the present invention.

Referring to the accompanying drawings wherein similar reference characters designate similar parts throughout, the improved brush consists of a suitable base structure, generally indicated at 10, on which two spaced, inverted, U-shaped side frames 11 and 12 are mounted. On the base structure there are two vertically disposed standards 13 and 14, the upper ends of which are secured to the tops of the side frames 11 and 12, respectively. These side frames are connected at their upper ends, as by a cross bar 15.

On the two standards 13 and 14 there are disposed sleeves 16 and 17 which are vertically movable on the standards and are also rotatably mounted thereon. These sleeves have rotary brushes 18 and 19 mounted thereon so that these brushes are disposed horizontally opposite each other and in spaced relation to each other. The brushes 18 and 19 are each longitudinally divided into two halves, which are held together in clamping relationship upon the sleeves by means of bolts 20. See Fig. 4. These bolts are removable, enabling the brushes to be removed from the sleeves for cleaning and washing purposes whenever occasion requires.

Figure 2:
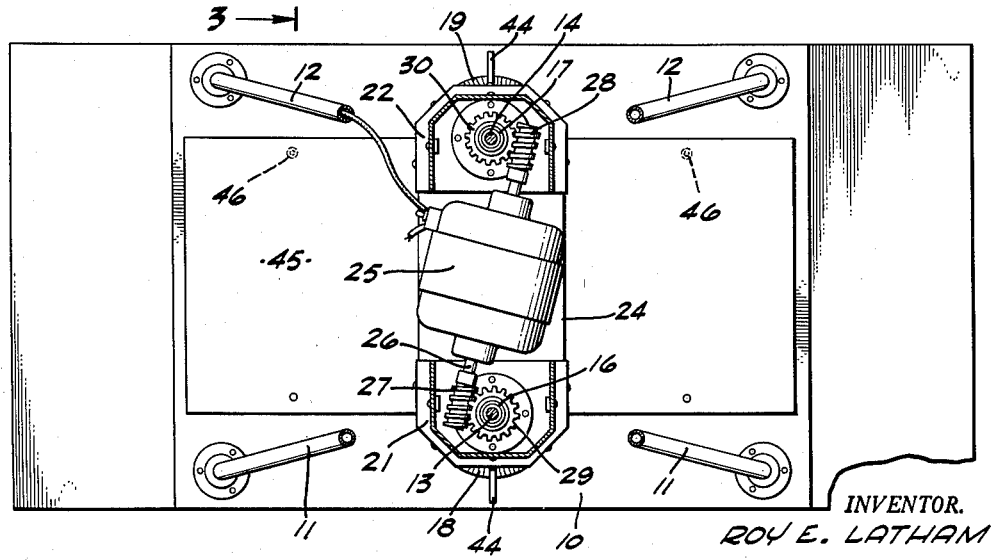
Fig. 2 is a horizontal section taken substantially upon the line 2—2 upon Fig. 1.

Above the two brushes 18 and 19 there are two housings 21 and 22, which are mounted on the sleeves by means of anti-friction bearings 23. The housings are connected to each other by a motor support 24 which supports an electric motor 25, the rotor shaft of which is indicated at 26. On the ends of the rotor shaft there are mounted two worms 27 and 28, see Fig. 2, which mesh with worm gears 29 and 30 that are rigidly mounted on the sleeves 16 and 17. As will be noted from Fig. 2, one of the worms engages its worm gear on the forward side thereof, whereas the other worm engages its worm gear on the rearward side thereof. With this arrangement the motor 25 when energized causes the two sleeves to rotate in opposite directions so that the inner portions or most adjacent portions of the peripheries of the two brushes 18 and 19 will be moving in the same direction.

A rotary shaft 31 that is substantially horizontally disposed is rotatably mounted on the two housings 21 and 22 and carries a rotary brush 32 designed to be engageable with the back of the animal. This brush may likewise be longitudinally divided into two halves that are clamped together on the shaft in the same manner as depicted in Fig. 4, so that this brush may also be removed from time to time for cleaning or washing purposes.

On the end of the shaft 31 there is a miter gear 33 which meshes with a complementary miter gear 34 that is secured to one of the sleeves. In this manner the motor 25 is operatively connected to all of the three brushes to forcibly rotate them.

On the lower ends of the sleeves there are mounted collars 35 and 36, beneath which there are anti-friction bearings 37 and 38. These anti-friction bearings are, in turn, supported on coil compression springs 39 and 40, which, in turn, are supported on collars 41 and 42 on the standards 13 and 14. The collars 41 and 42 are vertically adjustable on the standards and to this end the standards are periodically grooved with grooves 43 which are engageable by spring actuated latches 44. By reason of the spring supports afforded by the springs 39 and 40 the sleeves, the brushes, and the motor are all yieldably supported on the standards so that as the animal stands between the brushes the entire structure is vertically movable in accordance with movements of the animal.

On the base structure 10 there is disposed a depressible platform 45 that is urged into its upper or undepressed position by compression springs 46. Beneath the platform there is a switch 47 that is in electric circuit with the motor 25. This switch closes the circuit through the motor whenever the platform 45 is depressed by the weight of the animal thereon, but when the animal moves from the platform the springs 46 are effective to lift the platform, thus allowing the switch 47 to open the circuit through the motor, causing operation of the device to be discontinued.

Intelligent animals who become familiar with the animal brush may voluntarily walk between the brushes onto the platform 45 and thus by their own weight they may close the circuit through the motor, causing the brushes to be rotated. Usually a dog will move back and forth to a limited extent between the brushes to cause the brushes to scratch those portions of his hide that he desires. Frequently, dogs may hunch their backs to some extent to cause the upper brush 32 to more vigorously brush or scratch their backs. When this occurs, the entire structure may be lifted to some extent and on lowering his back the structure may descend on the compression springs 39 and 40.

By means of such a construction, dog fanciers will find that on teaching their dogs to become acquainted with the brushes, dogs will voluntarily enter it for brushing and scratching purposes. The continued brushing tends to keep the coat of the dog in prime condition so that whenever the dog is shown in a dog show the coat is in excellent condition, reflective of regular brushing and grooming. Dogs that like to be scratched very quickly become acquainted with the apparatus and the fact that it is not injurious to them, and that the apparatus may be turned on to become operative by merely walking between the brushes.

Various changes may be made in the details of construction without departing from the spirit and scope of the invention as defined by the appended claims.

I claim:

1. A device of the class described comprising two spaced rotary brushes rotatable about upright axes and a third rotary brush rotatable about a substantially horizontal axis and disposed adjacent the upper ends of said brushes, an electric motor operatively connected to the brushes for rotating them, a depressible platform beneath the brushes, and a switch in circuit with the motor operable by depressing the platform to close an electric circuit through the motor and to open the circuit when the platform is no longer depressed.

2. A device of the class described comprising two spaced rotary brushes rotatable about upright axes and a third rotary brush rotatable about a substantially horizontal axis and disposed adjacent the upper ends of said brushes, power means operatively associated with the brushes for rotating said brushes, means operatively associated with the power means and located beneath the third rotary brush for controlling the power means, and means for supporting the brushes and power means resiliently and for vertical movement.

3. A device of the class described comprising a pair of spaced upright standards, sleeves carrying rotary brushes rotatably and slidably mounted thereon, an electric motor operatively connected to the sleeves by which the sleeves may be rotated, said electric motor being supported by the sleeves so as to be vertically movable therewith, a horizontally disposed rotary brush supported upon the sleeves so as to be vertically movable therewith and operatively connected to one of the sleeves so as to be rotated thereby, and means for energizing the electric motor.

4. A device of the class described comprising a pair of spaced upright standards, sleeves carrying rotary brushes rotatably and slidably mounted thereon, an electric motor operatively connected to the sleeves by which the sleeves may be rotated, said electric motor being supported by the sleeves so as to be vertically movable therewith, a horizontally disposed rotary brush supported upon the sleeves so as to be vertically movable therewith and operatively connected to one of the sleeves so as to be rotated thereby, anti-friction bearings on the sleeves, springs supporting the anti-friction bearings, and means for energizing the electric motor.

5. A device of the class described comprising a pair of spaced upright standards, sleeves carrying rotary brushes rotatably and slidably mounted thereon, an electric motor operatively connected to the sleeves by which the sleeves may be rotated, said electric motor being supported by the sleeves so as to be vertically movable therewith, a horizontally disposed rotary brush supported upon the sleeves so as to be vertically movable therewith and operatively connected to one of the sleeves so as to be rotated thereby, anti-friction bearings on the sleeves, collars adjustably mounted on the standards, compression springs between the collars and the anti-friction bearings yieldably supporting the sleeves and structure thereon, and means for energizing the electric motor.

6. A device of the class described comprising a pair of spaced upright standards, sleeves carrying rotary brushes rotatably and slidably mounted thereon, an electric motor operatively connected to the sleeves by which the sleeves may be rotated, said electric motor being supported by the sleeves so as to be vertically movable therewith, a horizontally disposed rotary brush supported upon the sleeves so as to be vertically movable therewith and operatively connected to one of the sleeves so as to be rotated thereby, anti-friction bearings on the sleeves, collars adjustably mounted on the standards, compression springs between the collars and the anti-friction bearings yieldably supporting the sleeves and structure thereon, a depressible platform between the standards, and a switch operable by the platform in circuit with the motor whereby when the platform is depressed the circuit through the motor will be completed and when the platform is allowed to rise the circuit through the motor will be broken.

7. A device of the class described comprising two spaced rotary brushes rotatable about upright axes and a third rotary brush rotatable about a substantially horizontal axis and disposed adjacent the upper ends of said brushes, means supporting said brushes for vertical movement, spring means operatively associated with said first-named means for supporting said brushes in a normal position from which they may be moved in a vertical direction, power means operatively connected to said brushes for rotating said brushes, and means connected to said power means for controlling the power means.

References Cited in the file of this patent

UNITED STATES PATENTS

| 1,237,784 | Hurff | Aug. 21, 1917 |
| 1,505,641 | Hendrickson | Aug. 19, 1924 |
| 1,677,560 | Koerner | July 17, 1928 |
| 2,663,041 | Rende | Dec. 22, 1953 |

FOREIGN PATENTS

| 703 | Great Britain | 1875 |